United States Patent [19]

Phelps et al.

[11] 4,428,667
[45] Jan. 31, 1984

[54] DOCUMENT DESKEWING SYSTEM

[75] Inventors: Russell L. Phelps, Penfield; Jeffrey L. Sisson, Macedon; Karl E. Liechty, Pittsford, all of N.Y.

[73] Assignee: Xerox Corporation, Stamford, Conn.

[21] Appl. No.: 404,254

[22] Filed: Aug. 2, 1982

[51] Int. Cl.³ .......................................... G03G 15/00
[52] U.S. Cl. ............................ 355/3 SH; 271/245; 355/50; 355/75
[58] Field of Search ................. 355/3 SH, 23-26, 355/48, 50, 51, 75, 14 SH; 271/226, 229, 245, 246, 264

[56] References Cited

U.S. PATENT DOCUMENTS

| | | | |
|---|---|---|---|
| 3,072,397 | 1/1963 | Kelchner | 271/53 |
| 3,633,902 | 1/1972 | Worden | 271/51 |
| 3,865,482 | 2/1975 | Bendall | 355/14 SH |
| 3,889,943 | 6/1975 | Krayer | 271/4 |
| 4,076,233 | 2/1978 | Knight et al. | 271/233 |
| 4,076,408 | 2/1978 | Reid et al. | 355/14 |
| 4,084,900 | 4/1978 | Yamaoka et al. | 355/14 |
| 4,097,146 | 6/1978 | Sasamori | 355/75 |
| 4,098,551 | 7/1978 | Komori et al. | 355/26 X |
| 4,132,401 | 1/1979 | Gauronski et al. | 355/14 SH |
| 4,171,128 | 10/1979 | Irvine et al. | 271/3 |
| 4,183,519 | 1/1980 | Harris | 271/245 |
| 4,213,603 | 7/1980 | Peffer et al. | 271/229 |
| 4,266,762 | 5/1981 | Kramer et al. | 355/3 SH |
| 4,270,746 | 6/1981 | Hamlin | 271/98 |
| 4,278,344 | 7/1981 | Sahay | 355/14 SH |
| 4,322,160 | 3/1982 | Kobus | 271/245 |
| 4,334,759 | 6/1982 | Clausing | 355/14 SH |
| 4,335,949 | 6/1982 | Kukucka et al. | 355/3 R |
| 4,335,954 | 6/1982 | Phelps | 355/14 SH |
| 4,358,197 | 11/1982 | Kukucka et al. | 355/14 R |

Primary Examiner—R. L. Moses

[57] ABSTRACT

For a document sheet feeding and registration apparatus and method for deskewing and registering a document sheet relative to a registered copying position on a copier platen by feeding it against a sheet aligning document registration member, there is disclosed apparatus for initially feeding the document sheet towards the registration means with a first document sheet feeder exemplified by a widely transversely spaced pair of high friction sheet feeding rollers, which resist skewing of the document sheet, and removing the first document sheet feeder from the document sheet after its lead edge is engaged by a second document sheet feeder and before the document sheet engages the registration edge stop so that final skewing control of the document sheet is only by the second document sheet feeder, this second document sheet feeder being a single sheet feeding roller positioned centrally of the document sheet lead edge area and positioned closely adjacent the registration edge. This single roller provides a brief low rotational resistance deskewing of the document sheet while driving the document sheet into final alignment with the registration member. All of the sheet feeding rollers are positioned over the document on the platen extending through a backing plate so as to be hidden during copying.

15 Claims, 4 Drawing Figures

DOCUMENT DESKEWING SYSTEM

The present invention relates to a document handling system and more particularly relates to an improved method and apparatus for automatically registering and deskewing individual document sheets to be copied on a copier platen.

As xerographic and other copiers increase in speed, and become more automatic, it is increasingly important to provide higher speed yet more reliable and more automatic handling of the original document sheets being copied, i.e. the input to the copier. It is desirable to feed, register and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling, allowing an operator to "stream feed" originals into an input of the copier document handler, with the document handler doing the deskewing final registration and feeding of the documents into and through the copying position, and then ejecting the documents automatically. However, for compact and low cost copiers, an appropriate document handler must also be simple, low cost and compact.

A preferable document handling system is one that utilizes an existing or generally conventional copier optical imaging system, including the external transparent copying window (known as the platen) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable for the same registration edge or position to be available for such manual copying as is used for the document handler.

In the description herein the term "document" or "sheet" refers to a conventional flimsy sheet of paper, plastic, or other conventional or typical individual image substrate (original or previous copy), and the like, and not to microfilm or electronic image originals, which are generally much easier to manipulate. A "simplex" document or copy sheet is one having its page and image on only one side or face of the sheet, whereas a "duplex" document or copy sheet has pages and images on both sides.

The present invention is particularly suitable for pre-collation copying, i.e. multiply automatically recirculated document copying provided by a recirculating document handling system or "RDH", although is also compatible with non-precollation or post-collation copying, or with semiautomatic document handling (SADH) as discussed above. Precollation, collation, or RDH copying, as it is variably called, is a known desirable feature for a copier, and provides a number of important advantages. In precollation copying any desired number of collated copy sets may be made by making a corresponding number of recirculations of the original document set in collated order past the copier imaging station and copying each document page only once each time it circulates past the imaging station. The copies thereby automatically exit the copier in precollated sets, and thus do not require subsequent collation in a sorter or collator. On-line finishing and/or removal of completed copy sets may thus be provided while further copy sets are being made from the subsequent circulations of the same document set.

However, a disadvantage of precollation copying systems is that the documents must all be repeatedly circulated for copying in a predetermined order by a number of circulations equivalent to the desired number of copy sets. Thus, increased document handling is necessitated for a precollation copying system, as compared to a post-collation copying system. Therefore, maximizing document handling automation while minimizing document wear or damage is particularly important in precollation copying.

In contrast, in a post-collation copying system plural copies are made at one time from each document page and collated by being placed in separate sorter bins. Thus, the document set need only be circulated (or manually or semi-automatically fed) to the imaging station once if the number of copy sets being made is less than the number of available sorter bins. A disadvantage is that the number of copy sets which can be made in one document circulation is limited by the number of available sorter bins. Also, a sorter adds space and complexity and is not well suited for on-line finishing. However, post-collation copying, or even manual document placement, are desirable in certain copying situations to minimize document handling, particularly for delicate, valuable or irregular documents, or for a large number of copy sets. Thus, it is desirable that a document handler for precollation copying system be compatible with, and alternatively usable for, post-collation and manual copying as well.

Although faster and more accurate automatic registration of the individual original document sheets at the correct position on the platen to be copied is desired, it is difficult to accomplish without skewing (slightly rotating) the document and/or damaging the edge of the document being stopped. Document sheets can vary widely in sheet size, weight, thickness, material, condition, humidity, age, etc. Documents may have curls, wrinkles, tears, "dog-ears", cut-outs, overlays, paste-ups, tape, staples, adhesive areas, or other irregularities. Unlike copy sheets, which generally are all from the same batch and cut from the same paper reams, and therefore of almost exactly the same condition and size, original document sheets often vary considerably even if they are all of the same "standard" size, (e.g. letter size, legal size, A-4, B-4, etc.) because they have come from different paper batches or have variably changed size with different age or humidity conditions, etc. Yet it is desirable to automatically or semi-automatically rapidly feed, register and copy a set of individual documents with a mixture of sizes, types, and conditions without document jams or document damage and with each document correctly and accurately aligned to the registration position.

One of the most difficult to achieve requirements for automatic document handling is the accurate and reliable, but safe, registration of the original document at the proper position for copying. Conventionally the document is desirably automatically either center registered or corner registered (depending on the copier) by the document handler at a pre-set registration position relative to the copier platen, with two orthogonal edges of the document precisely aligned with two registration lines of the copier platen i.e. with the original document aligned with the copier optics and copy sheet registration system. This registration accuracy is desirably consistently within less than 1 millimeter. If the document is not properly registered, then undesirable dark borders and/or edge shadow images may appear on the ensuing copy, or information near an edge of the document may be lost, i.e. not copied onto the copy sheet. Skewing can also affect proper restacking of the documents.

As shown in the cited art, document handling systems have been provided with various document transports to move the original document sheets over the copier platen and into and out of registration. Various combinations of such transports are known with various registration devices or systems. It is known in the art to register the original document for copying at the appropriate position relative to the transparent copying window in various ways. Typically the document sheet is registered by driving it against a gate or stop at or adjacent one edge of the platen. This may comprise projecting aligned fingers, or roller nips, or a single vertical surface, against which an edge of the sheet is driven into abutment to register the sheet. An important function of such registration is to also deskew the moving original document, i.e., to properly rotate and align it with the registration line as well as to determine and control its registration position.

As indicated, it is conventional to provide either fixed or retractable registration finger or gate document stopping edges aligned along the one edge of the platen, so as to physically register the document in its copying position. This also reduces transport criticality, i.e. allows slip or skewing of the document feeder to be accommodated and corrected. The document transport can be designed to slip briefly relative to the document lead edge striking the registration edge stop until positive deskewing and full registration are achieved. The same platen transport sheet feeder if preferably used to drive a document onto and off of the platen before and after copying as well as registering the lead edge of the document at the downstream platen edge. Registering the trail edge of the document by reversing the feeder and backing the document into a fixed registration edge at the upstream edge of the platen may be alternatively provided. In some document handling systems a system for also side registering or laterally positioning the document on the platen is used, i.e. positioning of the original on two axes on the platen. However this is not required, and lateral registration may be done upstream of the platen.

A severe limitation on such over-platen document sheet feeding and registering systems is that they must have sufficient friction to reliably feed the document sheet, but must slip relative to the platen glass when no document sheet is therebetween without scratching or wearing the glass such that imaging through the glass is affected and must also slip relative to the document when it is stopped by the registration edge stop. Likewise the over-platen transport should not cause "show around" problems—i.e. undesirable dark areas or images on the copy sheet, especially for undersized documents, by visible portions of the transport extending beyond the document edges during copying. This has led to the use of single large white elastomeric belts for many document handlers in lieu of rollers or multiple belts, but such single belt systems have some inherent compromises in feeding and registration reliability. This is discussed, for example, in U.S. Pat. No. 4,353,541 filed Sept. 24, 1980 by W. J. Parzygnat and the art therein, and also disclosed in several of the references cited below.

Another such limitation or compromise is that a document feeding system which minimizes the introduction of document sheet skewing in the feeding system from the document set stack to the registration position on the platen is highly desirable, in order to reduce the amount of skew needing correction (deskewing) in the registration position. Yet it is also desirable, but normally incompatible, to maximize document skewing during the document registration, i.e. to allow the document to be freely deskewed as it is driven into alignment with the registration edge. It is also desirable not to have significant edge guide drag on the documents, so that method of skew-prevention is not fully satisfactory. The present invention compatibly provides both of these features without introductory edge guide drag.

Examples of further details of exemplary recirculating document handlers with on-platen registration and deskewing with which the present invention may be utilized are disclosed in U.S. Pat. Nos. 4,335,954 issuing June 22, 1982 to the same Russell L. Phelps; 4,278,344 issued July 14, 1981 to R. B. Sahay; 4,270,746 issued June 2, 1981 to T. J. Hamlin and 4,076,408 issued Feb. 28, 1978 to M. G. Reid, et al. Said Phelps U.S. Pat. No. 4,278,344 is of particular interest to this application and incorporated by reference.

Further as to some of the individual features in the embodiment disclosed herein, one form of a "floating ski" (a planar gravity floating sheet buckle suppressing plate associated with a sheet feed roller drawing copy sheets against an aligning surface) is disclosed in U.S. Pat. No. 4,087,087 issued May 2, 1978 to John H. Looney, and in FIG. 4 of U.S. Pat. No. 4,358,197 filed Aug. 21, 1980 by W. P. Kukucka et al. Another such "scuffer wheel" feeder and associated gravity loaded assisting "ski" plate, for driving copy sheets against both the side and end walls of a sorter bin, is disclosed in FIG. 5 of pending U.S. application Ser. No. 180,184 filed Aug. 21, 1980 by Stephen A. Rhinehart et al., the EPO equivalent of which, Application No. 81303835.3, was published Mar. 3, 1982 as EPO Publication No. 0046675.

Document feed wheel rollers for ejecting documents from the platen extending through apertures in a liftable document clamp (a planar light-reflective copying background surface) are disclosed, for example, in the above-cited U.S. Pat. No. 4,335,954, and in 3,888,585 issued June 10, 1975 to Thomas R. Cross.

Examples of various other patents teaching document handlers and also control systems therefor, including document path switches, are U.S. Pat. Nos. 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344 and 4,284,270.

Conventional simple software instructions in a copier's conventional microprocessor logic circuitry and software of document handler and copier control functions and logic, as taught by the above and other patents and various commerical copiers, are well known and preferred. However, it will be appreciated that the document handling functions and controls described herein may be alternatively conventionally incorporated into a copier utilizing any other suitable or known simple software or hard wired logic systems, switch controllers, etc. Such software for functions described herein may vary depending on the particular microprocessor or microcomputer system utilized, of course, but will be already available to or readily programmable by those skilled in the art without experimentation from the descriptions provided herein.

It is also known for copier jam detection to measure the time for passage of a copy sheet between two or more switches spaced along the copy sheet path and to actuate a jam signal or copier shut-down if that time period exceeds a preset time period (indicative of the sheet being jammed somewhere at or between the two switches). An example is disclosed in U.S. Pat. No. 4,084,900 issued Apr. 18, 1978 to S. Yamaoka, et al. A jam detector with a time delay for a recirculating document handler is disclosed in U.S. Application Ser. No. 358,080 filed Mar. 15, 1982 by T. Acquaviva.

Feeding of document sheets into registration over the platen of a copier with a single relatively narrow central feeding belt is disclosed in U.K. patent specification No. 1,411,550 published Oct. 29, 1975 by Eastman Kodak Company (C. M. Brooks, et al.) and U.S. Pat. No. 4,076,233 issued Feb. 28, 1978 to C. Knight et al. (Xerox Corporation). The latter includes belt supporting rollers for contacting the platen in two separate areas, one of which rollers (400) closer to registration member 40 being movable.

The following U.S. patents were also noted as to various other sheet feeding roller systems in general: U.S. Pat. Nos. 4,171,128 (Irvine); 4,183,519 (Harris); 3,072,397 (Kelchner); 3,633,902 (Worden); 3,889,943 (Krayer); 4,097,146 (Sasamori); and 4,213,603 (Peffer et al.).

The above U.S. Pat. No. 4,171,128 discloses an original document feeding device for a copier platen in which a system of roller pairs is used to move a document across a platen. The roller pairs can apparently be engaged separately for different positions of the document. U.S. Pat. No. 4,183,519 discloses a document sheet registration device wherein a pair of rollers 20 are used to move a document across the platen to its registration position against retractable fingers. U.S. Pat. No. 4,213,603 utilizes two pairs of rollers therefor. U.S. Pat. No. 3,072,397 discloses a roller unit to feed a thin flexible sheet. However, the roller unit comprises a spaced plurality of tires. U.S. Pat. No. 3,633,902 discloses a sheet feeding mechanism in which air jets lift a sheet up against a single tire with a soft periphery whose rotation is used to advance the sheet. U.S. Pat. No. 4,097,146 disclosed an apparatus which may, or may not, use a single roller to engage a sheet and discharge it from a platen (its disclosure is unclear).

All references cited herein, and their references, are incorporated by reference herein for appropriate teachings of additional or alternative details, features, and/or technical background.

The present invention desirably overcomes or reduces various of the above-discussed problems. A preferred feature disclosed herein is to provide, in a document sheet feeding and registration apparatus for deskewing and registering a document sheet relative to a copying position on a copier platen by feeding it against a sheet aligning document registration means, the improvement comprising:

first document sheet feeding means for initially feeding a document sheet towards the registration means comprising transversely extending high friction sheet engaging and feeding means for resisting skewing of the document sheet as it is being fed thereby;

second document sheet feeding means adjacent said registration means for engaging the leading edge area of the document sheet intermediately thereof, said second document sheet feeding means providing low rotational resistance to deskewing of the document sheet while feeding the document sheet into alignment with said registration means, and disengagement means for removing said first document sheet feeding means from said high-friction engagement with the document sheet after the leading edge of the document sheet is under the influence of said second document sheet feeding means but before the document sheet engages said registration means so that control of the document sheet is only by said second document sheet feeding means during the feeding of the document against the document registration means and its deskewing thereby.

Further features which may be provided by the method and apparatus disclosed herein include those in which said disengagement means for removing said first document sheet feeding means from said high friction engagement with the document sheet comprises camming means for rapidly intermittenly lifting said first sheet feeding means away from said platen; wherein said first and second document sheet feeding means are commonly driven in a single direction of rotation except during copying of the document sheet; wherein said first document sheet feeding means are lifted away from said platen by said camming means only briefly during a brief final movement of the document sheet into registration and are lowered back into engagement with the document sheet for its ejection from the platen; wherein said first document sheet feeding means consists of widely transversely spaced high friction and highly deformable frictional sheet feeding rollers normally deformably engaging said platen and positioned to normally engage areas on opposite sides of the document sheet, and said second document sheet feeding means comprises a single roller positioned to centrally engage and feed a lead edge area of the document sheet being initially fed towards the registration means by said first document sheet feeding means and spaced substantially downstream from said first document sheet feeding means; and all of said sheet feeding rollers of both said first and second document sheet feeding means overly the copier platen within the area of the copier platen normally covered by a document sheet in its registered copying position on the platen to avoid exposure thereof during copying and extending through a light reflective document sheet backing plate member; and wherein a downstream portion of said backing plate member extending between said second document sheet feeding means and said registration means is separately movable against the document sheet relative to the other portion of said backing plate member to inhibit buckling of the document sheet during registration; and wherein said first document sheet feeding means is automatically lifted away from said platen and said document sheet by said disengagement means at approximately the time of arrival of the lead edge of the document sheet in said nip between said single roller of said second document sheet feeding means and said platen, and wherein the sole driving engagement of the document sheet, in only a short final movement into engagement with said registration means, is by said single roller intermediately engaging and pulling a leading edge area of the document sheet towards said registration means so as to allow deskewing by said registration means but without introducing substantial document sheet skewing by said second document sheet feeding means; and/or wherein said disengagement means automatically reengages said document sheet with said first document sheet feeding means for ejection of the document sheet from the platen after the document sheet has been copied, and wherein said second document sheet feeding means is a roller which is rotatably driven except during copying of the document sheet.

Various of the above-mentioned and further features and advantages will be apparent from the examples described hereinbelow of specific apparatus and steps of operation. The invention will be better understood by reference to the following description of one specific embodiment thereof, which includes the following drawing figures (approximately to scale) wherein.

Figure 1:
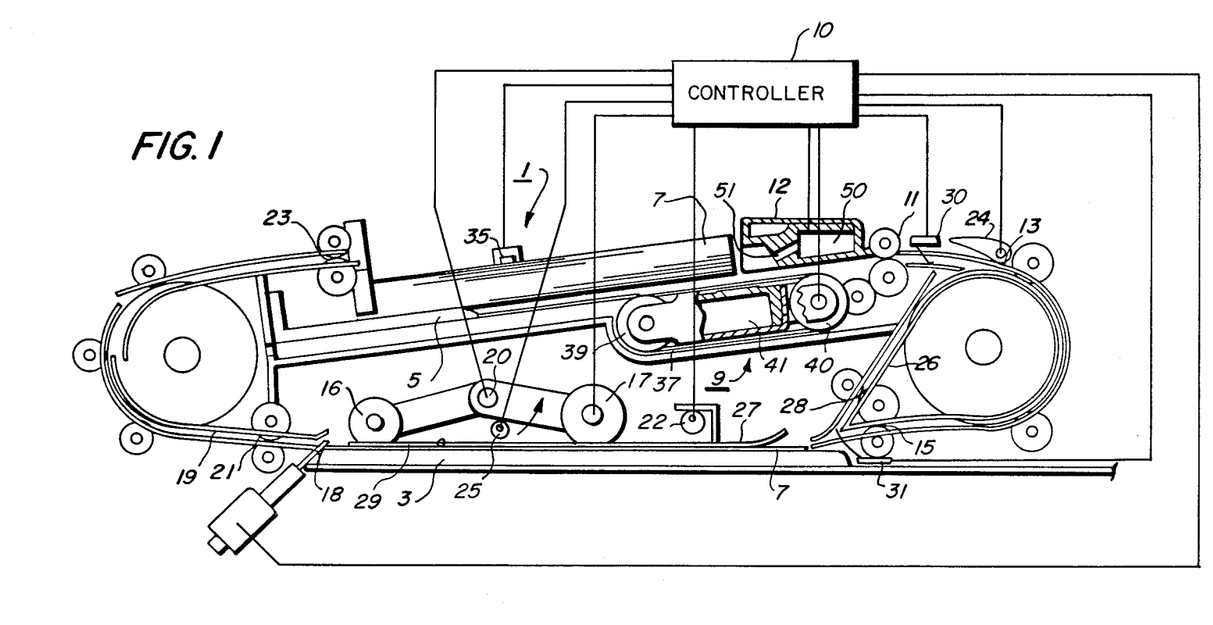
FIG. 1 is a side view of an embodiment of an exemplary document handling apparatus utilizing the registration system of the present invention.

The exemplary document sheet handling system disclosed in FIG. 1 may be conventional except as otherwise described herein, and may be mounted to any suitable or conventional copier. Disclosed here, but not limited thereto, is a conventional over-platen recirculating document sheet handler (RDH) for precollation copying. An SADH mode or alternative document feeder may also be utilized. Here a set of document sheets in conventional page order are stacked (loaded) into a restacking tray to be fed seriatim from the bottom of the stack by a vacuum belt or other suitable output feeder, preferably assisted by an air knife, both of which are at the front or downstream edge of the stack. Each sheet is fed out on the copier platen, registered (including deskewing) and then copied once and returned via a restacking transport which feeds the returning sheet in over the top of the stack from the rear of the stack and releases the sheet to restack by setting down on top of the stack between laterally aligning edge guide members. Thus, the document sheets may be continuously recirculated in the same order as often as desired to produce the desired number of collated copy sheet sets.

Referring first particularly to FIG. 1, there is illustrated an exemplary automatic document handler 1 for installation over the exposure platen 3 of a conventional xerographic reproduction machine as described in the above-cited U.S. Pat. No. 4,270,476. The document handler 1 has a document tray 5 for supporting a stacked set of individual document sheets 7. A vacuum belt corrugating feeder system 9 is located below the front or forward area of the document tray for acquiring and corrugating the bottom document sheet in the stack and for feeding out that document sheet to a take-away set of roll pairs 11 after an air knife 12 has had time to help separate that bottom sheet from the rest of the stack. That document is then fed by the take-away roll set 11 through document guides 13 to a feed-roll set nip 15 and onto the platen of the copy machine for reproduction. A retractable registration edge 18 is provided here to register the lead edge of the document fed onto the platen.

The critical and novel document sheet feeding registration and deskewing on the platen is accomplished by a pair of rollers 17 and a single roller 16. As will be further described herein, the initial feed-in of the document sheet over the platen 3 is controlled by a spaced pair of high friction drive rolls 17 which resist sheet skewing, but then both the final registation and the sheet ejection are controlled by a single downstream roller 16 located close to the registration edge 18 and centrally of the document sheet lead edge. (See FIG. 4 including the dashed line document 7 registration position). The two upstream rollers 17 are automatically lifted up off of the platen glass 3 to allow the control of the sheet to be solely by the single downstream roller 16 during registration, thereby allowing the sheet to much more easily pivot for improved deskewing during registration. That is, there is disclosed here an over-platen document feeding and registration system which automatically switches from skew-preventing plural feed rollers 17 to a single skew-providing roller 16 near the registration edge 18 for document sheet deskewing registration.

Following exposure of the document, the registration edge 18 is retracted by suitable means such as the solenoid shown. The document is then fed off the platen by rollers 16 and 17 into guide 19 and (optionally) feed-roll pair set 21 and returned back to the top of the document stack 7 through a feed-roll set 23.

When it is desired to present the opposite sides of duplex documents for exposure, the duplex document is fed from the stack 7 through guides 13 until the trail edge passes document diverter 24. Document diverter 24 is then rotated counterclockwise, i.e. into the document sheet path. The document direction is also then reversed and the document is diverted by diverter 24 through guides 26 and feed-roll set nip 28 onto the platen 3, as described in detail in the above-cited U.S. Pat. No. 4,278,344.

The document handler 1 is also provided with a sheet separator finger 35, as is well known in the art, to sense and indicate the documents to be fed versus those documents returned to the document handler, i.e. to count each completed document set circulation. Upon removal (feed out) of the last document sheet from beneath sheet separator finger 35, the finger 35 drops through a slot provided in the tray 5 to actuate a sensor indicating that the last document in the set has been removed from the tray. The finger 35 is then automatically rotated in a clockwise direction or otherwise lifted to again come to rest on top of all the documents in the stack for the start of the next circulation of the document set.

The document sheet separator-feeder 9 in FIG. 1 has a plurality of feed belts 37 supported for movement on feed belt rolls 39 and 40. Spaced within the run of the belts 37 there is provided a vacuum plenum 41 having openings therein adapted for cooperation with perforations in the belts 37 to provide a vacuum for pulling the bottom document in the document stack onto the belts 37. The plenum 41 is provided with a raised portion beneath the center belt 48 run so that upon capture of the bottom document in the stack against belts 37, a corrugation will be produced in the bottom sheet.

The air knife 12 of FIG. 1 includes a pressurized air plenum 50 having a plurality of separated air jet openings or orifices 51 to inject air between the bottom-most document pulled down against the feed belts and the documents thereabove to provide an air cushion or bearing between the stack and the bottom document to minimize the force needed for removing the botton document from the stack.

Each bottom sheet in the bottom sheet feeding tray 5, i.e. the document being fed from the document tray 5 in the recirculating document handler 1, is automatically basically deskewed and side registered before being fed out of the tray by the conventional adjustable spaced pair of side guides of the tray (not shown). However, some skewing of the document can also occur during feeding of the sheet between the tray and the registration position on the platen. The present system prevents, to the extent possible, such further skewing of the document sheet during most of its feeding by skew-preventing transports. It then provides for unobstructed deskewing, only in the brief final movement of the document into its registration position over the platen, with a second, skew-allowing, transport (roller 16). To this end, the feed roller sets 11, 15, 17, 21, 23 and 28 of the document transport path are plural and commonly driven rollers or belts spaced transversely across the document path to resist non-uniform feeding or skewing of the document sheet.

Considering further input feeding path for the document sheets 7 out from the stack thereof for copying on the platen, it may be seen that each document sheet as it is fed passes an upstream switch 30 (here adjacent the tray 5 output) and then a downstream switch 31 (here adjacent and just prior to the document being fed onto the platen 3). The exact location of these two switches 30 and 31 is not critical. The two switches are actuated in sequence by the document lead edge during the feeding of documents to be copied and before that document reaches the second and final platen transport (roller 16). Since the switches 30, 31 and guide 13 are stationary, the substantial sheet path distance between the two switches is constant. Thus the time period between actuation of switch 30 and the subsequent actuation of switch 31 is directly proportional to the actual velocity of the document sheet being fed to the platen transport. Accordingly, any variations in the document sheet feeding velocity, due for example to variations in line voltage, drive motor tolerances, drive train wear, sheet slippage, sheet drag, etc., will be directly measured. This information, preferably in the form of a conventional count of digital pulses from the conventional controller 10 clock source, may then be utilized for precise control of the platen transport drive, as futher described in detail hereinbelow.

Figure 2:
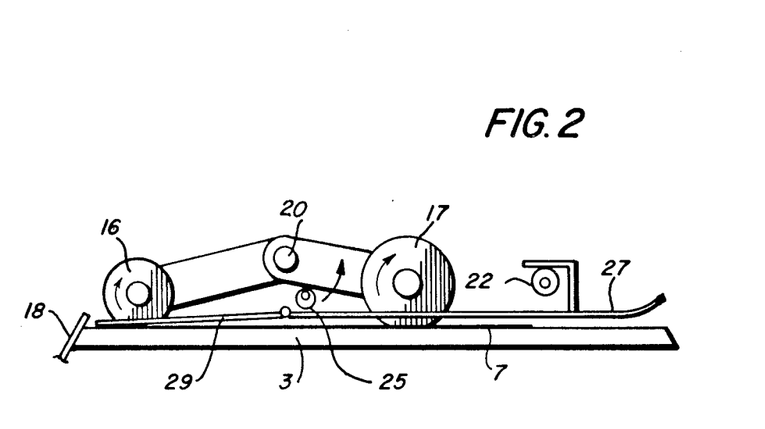
FIGS. 2 and 3 are a partial enlarged side view of the registration system embodiment of FIG. 1, shown in two different operating states.

After the document sheet 7 to be copied is fed past the second switch 31 it is fed onto the platen under a document clamp 27. This clamp 27 is a large generally planar light reflective surface member fully overlying the platen 3 to provide an optically uniform background against which the document may be copied. As shown in FIG. 2, the clamp 27 is lifted during the feeding movement of the document (both before and after copying) to reduce the frictional resistance to feeding of the document. During copying, as in FIGS. 1 and 3, the clamp 27 is lowered to flatten the document sheet against the platen. The clamp lifting movement may be accomplished by any suitable mechanism, such as the eccentric cam lifting system 22 illustrated (four such lifting points 22 may be provided).

As the lead edge of the document sheet passes under this backing plate or clamp 27, it is first engaged by a pair of document sheet feed rollers 17. As particularly shown in FIG. 4, it may be seen that these rollers 17 are widely spaced apart transversely of the direction of sheet feeding motion, and are commonly driven, via a common axis drive shaft 20 from motor "M" so as to reduce or prevent the introduction of any additional skew in the document sheet. This is assisted by utilizing wheels 17 which have a high friction surface and a large contact area. This may be provided for example by wheels 17 which have an outer skin or tread (e.g. 2 mm) of conventional high friction medium to high density microcellular urethane paper feed roller material, but an inner core of a much lower density, highly compressable, foam material to allow large deformation of the wheels 17 and therefore a large contact or tread area between the wheels 17 and the document sheet being fed, even with a relatively low downward normal force loading. Also, in contrast to the roller 16, the two rollers 17 engage areas on opposite sides of the document sheet.

Figure 4:
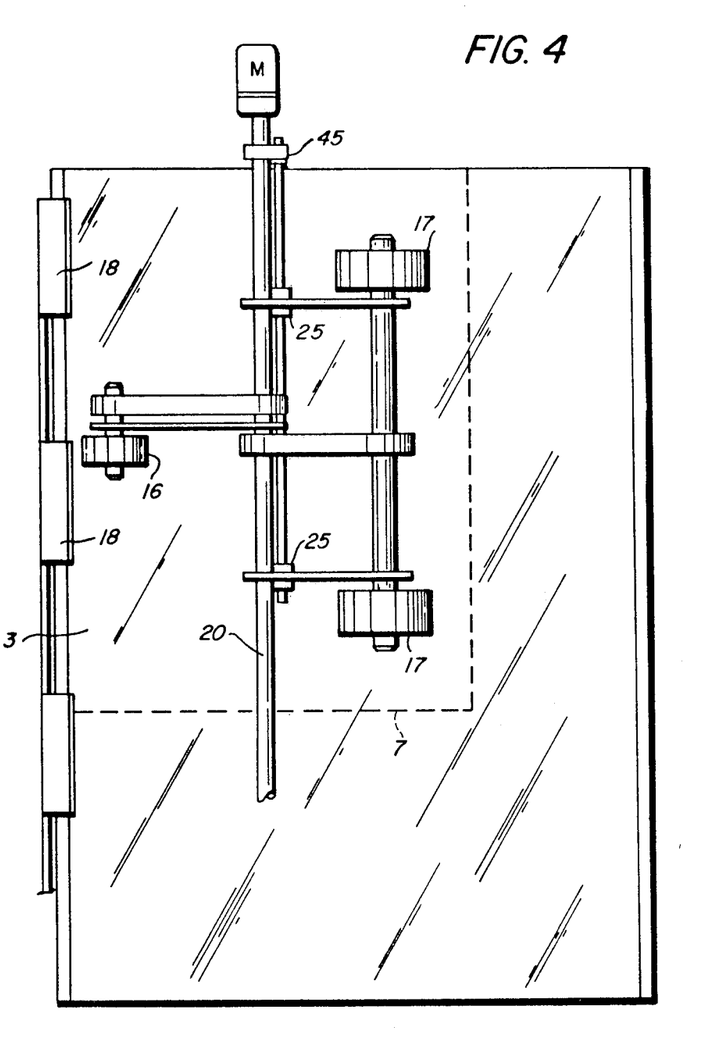
FIG. 4 is a partial plan (top) view of the system of FIGS. 2-3 with the platen clamp (27) removed for illustation clarity.

As shown by the illustrated dashed line document 7 position in FIG. 4, all three rollers which engage the document sheet in the overall over-platen transport system (the pair of rollers 17 and the downstream single roller 16) are all overlying the platen but within the area of the smallest standard size document being automatically registered. This reduces "show-around" problems because it allows all of the document edges to be backed by an unapertured area of the clamp surface 27, i.e. all of the drive wheels, and all of the apertures through which these wheels extend to drive the document sheet, are hidden behind (above) the document during copying.

As shown in FIG. 2, all of the rollers 16 and 17 are initially (and normally) down, i.e. allowed to rest with a normal force against the document sheet being fed into registration, and rotatably driven by motor M. As the document sheet is thus driven downstream toward the registration system 18, it is fed by the wheels 17 without allowing additional skewing into the nip of the single narrow gravity-loaded frictional feed wheel 16, which is positioned intermediately of (preferably centrally of) the document sheet being fed (referring to the lateral dimension of the document sheet, i.e. the dimension transverse the document sheet feeding direction). The nip between this single feed wheel 16 and the platen is closely adjacent the registration line, i.e. the registration fingers 18. As shown here this wheel 16 may be commonly driven and mounted from the same axis 20 as the rollers 17, although that is not required.

In contrast to the rollers 17, the roller 16 is a single narrow roller of uniform medium to high density microcellular urethane, so as to provide a good, relatively high, frictional driving of the document sheet, but only a relatively small contact area therewith, so as to provide little or no significant resistance to rotation (skewing or deskewing) of a document sheet thereunder. This wheel 16 remains down all of the time, i.e. throughout the entire copying cycle, in the present system.

The final feeeding of the document sheet into registration with deskewing which is provided by the single roller 16 is assisted here by a "ski" 29. This comprises a separately mounted (hinged) portion of the document clamp or backing member 27. As particularly shown in FIG. 2 this "ski" portion 29, which in effect forms a continuous "flap" along the entire trail edge area of the clamp 27, is gravity loaded and is free to hang down toward the platen with its free end adjacent the registration gate 18 even when the remainder of the clamp 27 is lifted. This "ski" 29 helps to hold down and resist buckling of the document sheet lead edge area as it is being driven by the roller 16 against the registration gate (finger set 18). The above-cited U.S. Pat. No. 4,087,087 issued May 2, 1978 to John H. Looney is noted for a further discussion as to this general type of device.

Figure 3:
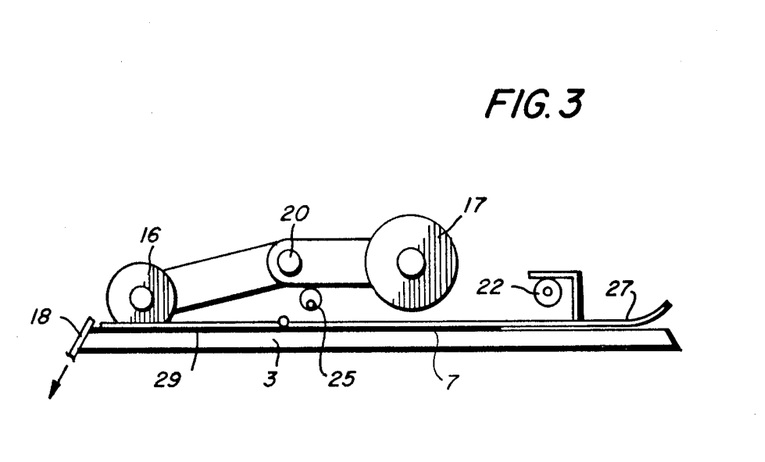

Referring now particularly to FIG. 3, by comparison to FIG. 2 it schematically illustrates the operation of the disclosed registration and deskewing system. The system is shown in FIG. 3 just after registration, deskewing and copying of document 17 has been completed. It may be seen that for the final registration and deskewing movement after the sheet has reached roller 16 (as in FIG. 2) that the roller pair 17 is lifted up away from the document sheet 7 and the platen 3. The particular lifting mechanism is not critical, and is illustrated here merely by way of example as an eccentric cam 25 mechanism actuated by a conventional electromagnetic clutch 45 as shown in FIG. 4 connecting with the same motor "M". Alternatively, a solenoid or other suitable electrically actuated mechanism may be provided. However, it is important that the timing, of this lifting of the rollers 17 out of high friction engagement with the document sheet be precisely controlled to coordinate with the capture and control of the document sheet by the roller 16 and to occur before the lead edge of the document sheet reaches the registration gate 18, as will be further described herein.

The desired point of lifting is as illustrated in FIG. 2, i.e. just after the lead edge of the document sheet has been captured by the roller 16 nip with the platen 3. Once the rollers 17 are lifted, the document is then under the control and feeding of only the single roller 16, which is pulling the lead edge of the document toward the registration edge 18 centrally of the document. Thus, if the document is skewed, one corner or side of the document will strike one finger 18 first. This will induce a rotational force on the document sheet tending to bring it into alignment. This rotational deskewing force is freely allowed (not resisted) by the single roller 16, which continues to drive the document forward until all deskewing is completed and the lead edge of the document is in linear abutment with the registration edge line 18. The roller 16 may then slip relative to the document sheet until its drive "M" is disengaged or shut off. However, that timing is not critical. Preferably the common drive system for all three wheels is only shut off very briefly shortly before (e.g. approximately 200 milliseconds before) the copying exposure (flash) occurs from the copier illumination system.

As soon as exposure is completed the motor "M" may be reengaged to all three wheels and also with the camming means 25 for lowering the wheels 17 into engagement with the document sheet. The clamp lifting mechanism 22 is also actuated at this time, and may be commonly driven. Concurrently therewith the registration gate 18 is lowered out of the document path. Thus all three wheels are in driving engagement with the document sheet for non-skewing ejection of the document sheet from the copier platen immediately after copying, and also for receipt and feeding of the next document to be copied. The distance between the point of contact of the roller 16 with the document sheet and the registration edge 18 is preferably as close as possible (within the operating tolerances of the system and the maximum skew distance to be corrected) to allow maximizing of the forward loading or driving force on the document sheet by the roller 16 without buckling the portion of the document sheet ahead of the roller 16 (i.e. between the roller 16 and the registration edge 18) but with a sufficient space to allow the above-described deskewing operation to be controlled and completed by the roller 16 acting alone. An increased forward driving force by roller 16 provides an increase in the available deskewing force on the document sheet. It has been found that a distance of only approximately one inch (2.5 centimeters) is appropriate.

Because the roller 16 is pulling the document from the center of its lead edge it is not inducing any significant skewing forces on the document. That is, the effective center of force to the external drag on the document is behind and approximately in line with the acting point of the roller 16 to minimize transport skew. Further, as noted, the transport distance by the roller 16 acting alone (i.e. the distance the document is fed by roller 16 after the skew controlling rollers 17 are lifted) is very short—it is only for the very final movement of the document sheet into registration. At all other times during the document feeding on the platen the document is under the firm control of the widely spaced pair of high friction and high contact area rollers 17 to prevent transport system skewing of the document.

As noted above, the timing of the actuation of clutch 45 controlling the lifting mechanism 25 for the rollers 17 is critical. This is due to the high transport velocity of the document sheet desired for a high rate copier together with the very short distance and time from the time the document is acquired by roller 16 until the document reaches the registration edge 18. It has been found that this precise timing control is preferably provided by measuring the actual document velocity or transport speed and controlling the timing of the lifting of the rollers 17 with that information. Specifically, by sensing the actual document transport velocity from the elapsed time between the actuation of switches 30 and 31 upstream of the platen transport system, a pulse count signal is provided for the controller 10 indicative of any changes in the document feeding velocity. This velocity measurement may be made for each sheet. Alternatively, to save computer time and memory, this information can be obtained once on the initial feeding of the document sheet for each operation of the copier and stored in the controller 10 memory for use throughout that copying operation or cycle (and then reset at the time of the next operation of the copier).

Since the distance between the switch 31 (or other switch at the entrance of the document sheet onto the platen) and the nip position of the roller 16 is a constant or known distance, once the document velocity is precisely determined then the time at which the lead edge of the document reaches this feed roll nip can be precisely determined. Thus, the clutch 45 can be actuated at the completion of a corresponding preset time delay following the actuation of the switch 31 (using a resettable time delay provided by a conventional software program or circuit therefor in the controller 10, e.g. starting a conventional electronic timing cycle countdown of a preset register count with the controller clock pulses). Thus, the clutch 45 engages at slightly different times dependent on the actual differences in the document feed-in velocity. This time delay can be reset by the measured change in elapsed time between the actuation of switches 30 and 31 by any suitable software.

A further (initial) adjustment may be provided at the factory or onsite to compensate for differences between copiers, including differences in this distance between the switch 31 actuating point and the roller 16 nip.

However, once this adjustment is made it need not be reset.

Thus, to summarize the above wheel 17 lifting timing, when variations in line voltages of the like slow down the document feed transport, then the time between the actuation of switches 30 and 31 will increase slightly, and this time increase is utilized by the controller 10 to directly proportionately increase the time delay in the actuation of the electrical clutch 45, so that even though the document is delayed the wheels 17 will still not lift out of sheet control until after the lead edge of the document sheet is under the control of the roller 16. Likewise, if the speed of the document transport increases for any reason, this will automatically correspondingly speed up the acutating time of the clutch 45 to insure that the wheels 17 lift before the lead edge of the document sheet reaches the registration edge 18. Thus, it may be seen that the wheels 17 are always lifted within the brief timing (and therefore positional) "window" of the sheet movement between the wheel 16 and the registration edge 18. This allows the wheel 16 to be positioned very close to the registration edge 18, i.e. with only a small such "window".

Various specific algorithms may be utilized in the controller 10 to determine the specific actuating time of the clutch 45 lifting wheels 17. A simple arithmetic calculation may be used. For example one formula expressing the timing relationship here is $C2=C1(D2/D1)+C3$; where C2 is the clock pulse count (time) for actuation of clutch 45, C1 is the pulse count between the activation of switches 30 and 31, D1 is the document path distance between those two switches, D2 is the distance between switch 31 and the nip of wheel 16, and C3 is a constant time delay corresponding to the system's response or mechanical delay time between the electrical signal being sent to clutch 45 and the resultant lifting of wheels 17 sufficiently high to remove their inhibition on document skeet deskewing. If C3 and the ratio of D1 to D2 are constants it may be seen that C2 is directly proportional to C1. If D1 is even approximately equal to D2 than a slight incremental increase or decrease in C1 corresponding to the slight document velocity change may be simply added to C2. Furthermore the constants D1, D2 and C3 need not be actually measured. The nominal actuating time C2 for clutch 45 can simply be preset into the system, e.g. by a technical representative preadjusting a potentiometer having conventional digital conversion of its output.

To express the timing relationship another way, the actual time period required to register the document is proportional to the nominal time period therefor times the ratio of the measured time between switches 30 and 31 to the nominal time therebetween.

If even further timing accuracy is desired, another conventional switch connected to controller 10 may be provided (illustrated by the circuit connecting line in FIG. 1) between rollers 17 (or other lifting mechanisms or clutch 45) to provide another signal indicative of the actual lifting movement (time) of rollers 17. This enables a corresponding additional compensating adjustment in the actuating signal time for clutch 45 compensating for any variations in the operating time for the rollers 17 lifting system including the actuating time for clutch 45.

The embodiment disclosed herein, and others, are intended to provide a more positive and reliable yet gentle and automatic control of the driving and registration forces on the document sheet during the entire process of feeding, registering, deskewing, and ejecting the document. It will also be appreciated that the embodiment described herein is merely exemplary and that other variations, modifications, refinements, or alternative embodiments may be made by those skilled in the art from this teaching. They are intended to be encompassed by the following claims.

What is claimed is:

1. In a document sheet feeding and registration apparatus for deskewing and registering a document sheet relative to a copying position on a copier platen by feeding it against a sheet aligning document registration means, the improvement comprising:

first document sheet feeding means for initially feeding a document sheet towards the registration means comprising transversely extending high friction sheet engaging and feeding means for resisting skewing of the document sheet as it is being fed thereby;

second document sheet feeding means adjacent said registration means comprising a single roller for engaging the leading edge area of the document sheet intermediately thereof, said second document sheet feeding means providing low rotational resistance to deskewing of the document sheet while feeding the document sheet into alignment with said registration means, and disengagement means for removing said first document sheet feeding means from said high-friction engagement with the document sheet after the leading edge of the document sheet is under the influence of said second document sheet feeding means but before the document sheet engages said registration means so that control of the document sheet is only by said second document sheet feeding means during the feeding of the document against the document registration means and its deskewing thereby.

2. The document sheet feeding and registration apparatus of claim 1 wherein said disengagement means for removing said first document sheet feeding means from said high friction engagement with the document sheet comprises camming means for rapidly intermittenly lifting said first sheet feeding means away from said platen.

3. The document sheet feeding and registration apparatus of claims 1 or 2 wherein said first and second document sheet feeding means are commonly driven in a single direction of rotation except during exposure of the document sheet.

4. The document sheet feeding and registration apparatus of claim 2 wherein said first document sheet feeding means are lifted away from said platen by said camming means only briefly during a brief final movement of the document sheet into registration and then are lowered back into engagement with the document sheet, and wherein said first and second document sheet feeding means cooperatively provide the ejection from the platen, of the document sheet after its exposure.

5. The document sheet feeding and registration apparatus of claims 1, 2 or 4 wherein said first document sheet feeding means consists of widely transversely spaced high friction and highly deformable frictional sheet feeding rollers normally deformably engaging said platen and positioned to normally engage areas on opposite sides of the document sheet, and said second document sheet feeding means comprises a single roller positioned to centrally engage and feed a lead edge area of the document sheet being initially fed towards the registration means by said first document sheet feeding means.

6. The document sheet feeding and registration apparatus of claims 1, 2 or 4 in which said first document sheet feeding means consists of widely transversely spaced high friction sheet feeding rollers, said second document sheet feeding means is a single sheet feeding roller closely adjacent said registration means and spaced substantially downstream from said first document sheet feeding means, and all of said sheet feeding rollers of both said first and second document sheet feeding means overly the copier platen within the area of the copier platen normally covered by a document sheet in its registered copying position on the platen to avoid exposure thereof during copying.

7. The document sheet feeding and registration apparatus of claim 6 further including a light reflective document sheet backing plate member through which said sheet feeding rollers extend through apertures therein and wherein a downstream portion of said backing plate member extending between said second document sheet feeding means and said registration means is separately movable against the document sheet relative to the other portion of said backing plate member to inhibit buckling of the document sheet during registration.

8. The document sheet feeding and registration apparatus of claims 1, 2 or 4 in which said second document sheet feeding means is a single narrow roller forming a nip with said platen closely adjacent said registration means, and wherein said first document sheet feeding means is automatically lifted away from said platen and said document sheet by said disengagement means at approximately the time of arrival of the lead edge of the document sheet in said nip between said single roller of said second document sheet feeding means and said platen, and wherein the sole driving engagement of the document sheet, in only a short final movement into engagement with said registration means, is by said single roller intermediately engaging and pulling a leading edge area of the document sheet towards said registration means so as to allow deskewing by said registration means but without introducing substantial document sheet skewing by said second document sheet feeding means.

9. The document sheet feeding and registration apparatus of claims 1, 2 or 4 wherein said disengagement means automatically reengages said document sheet with said first document sheet feeding means for ejection of the document sheet from the platen after the document sheet has been copied, and wherein said second document sheet feeding means is a roller which is rotatably driven except during copying of the document sheet.

10. In a document sheet feeding and registration method for deskewing and registering a document sheet relative to a copying position on a copier platen by feeding the document sheet against a sheet aligning document registration means, the improvement comprising the steps of:
   initially feeding the document sheet towards said registration means while inhibiting skewing with first document sheet feeding means transversely engaging the document sheet with high friction to resist skewing of the document sheet as it is being fed thereby,
   then removing said first document sheet feeding means from said high-friction engagement with the document sheet after the lead edge of the document sheet is under the influence of second document sheet feeding means and before the document sheet engages said registration means so that final skewing control of the document sheet is only by said second document sheet feeding means, and then driving the document sheet with said second document sheet feeding means into alignment with said registration means to deskew the document sheet,
   said second document sheet feeding means consisting of a single sheet feeding roller positioned intermediately of the document sheet in the direction transverse the document feeding direction, said single roller being positioned closely adjacent said registration means and substantially spaced downstream of the initial point of contact of said first document sheet feeding means with the document sheet, and said single roller providing low rotational resistance to deskewing of the document sheet about said single roller.

11. The document sheet feeding and registration method of claim 10 including the further step of automatically reengaging the document sheet with said first document sheet feeding means for ejection of the document sheet from the platen.

12. The document sheet feeding and registration method of claim 10 in which said first document sheet feeding means consists of a widely transversely spaced pair of high friction sheet feeding rollers, and all three said sheet feeding rollers are positioned to overly the copier platen within the area of the copier platen normally covered by a document sheet in its registered copying position on the platen to avoid exposure thereof during copying.

13. The document sheet feeding and registration method of claim 12 in which said three rollers movably extend through apertures therefor in a light reflective document sheet backing plate member, and wherein a downstream portion of said backing plate member extending between said second document feeding means and said registration means is separately movable against the document sheet relative to the other portion of said backing plate member to inhibit buckling of the document sheet during registration.

14. The document sheet feeding and registration method of claims 10, 11 or 12 in which said first document sheet feeding means is automatically lifted away from said platen and said document sheet at the time of arrival of the lead edge of the document sheet in the nip between said single roller of said second document sheet feeding means and said platen so that the sole driving engagement of the document sheet, in only a short final movement into engagement with said registration means, is by said single roller centrally engaging and pulling a leading area of the document sheet so as to allow deskewing by said registration means and without introducing substantial document sheet skewing by said second document sheet feeding means.

15. The document sheet feeding and registration method of claim 13 including the further step of automatically reengaging the document sheet with said first document sheet feeding means for ejection of the document sheet from the platen.

* * * * *